United States Patent [19]

Heilhecker et al.

[11] Patent Number: 4,522,450
[45] Date of Patent: Jun. 11, 1985

[54] BRAKE SYSTEM

[75] Inventors: Joseph K. Heilhecker, Houston; James E. Byrne, Spring, both of Tex.

[73] Assignee: GH TTE, Wichita Falls, Tex.

[21] Appl. No.: 489,116

[22] Filed: Apr. 27, 1983

[51] Int. Cl.³ .......................... B60T 7/12; B60T 11/26
[52] U.S. Cl. .......................................... 303/9; 303/2; 303/85
[58] Field of Search ........................ 303/2, 9, 84 R, 85

[56] References Cited

U.S. PATENT DOCUMENTS

| | | | |
|---|---|---|---|
| 3,278,242 | 10/1966 | Nakamura | 303/85 X |
| 3,279,865 | 10/1966 | Bohn | 303/85 X |
| 3,672,729 | 6/1972 | Blakey | 303/9 |
| 3,796,467 | 3/1974 | Kito et al. | 303/85 X |

Primary Examiner—Duane A. Reger
Attorney, Agent, or Firm—Vinson & Elkins

[57] ABSTRACT

A brake system in which brake means such as disc brakes are provided with emergency control means which may be a part of the overall system or may be provided by separate self contained sources of pressure which may be valved to the brake means by actuation of an emergency switch. The system provides for control of multiple groups of brake means with multiple control systems each of which are operated at a pressure less than that available from the power source. Pressure between the several groups of brakes are sensed and when a selected differential is noted the full source pressure is applied to the entire brake system. This additional source pressure applied to an undamaged bank of brake means will compensate for loss of a group of brake elements and provide approximately the same braking efficiency. Provision is made to contain pressure within one of the separate systems upon the sensing of conditions indicating a leak.

9 Claims, 4 Drawing Figures

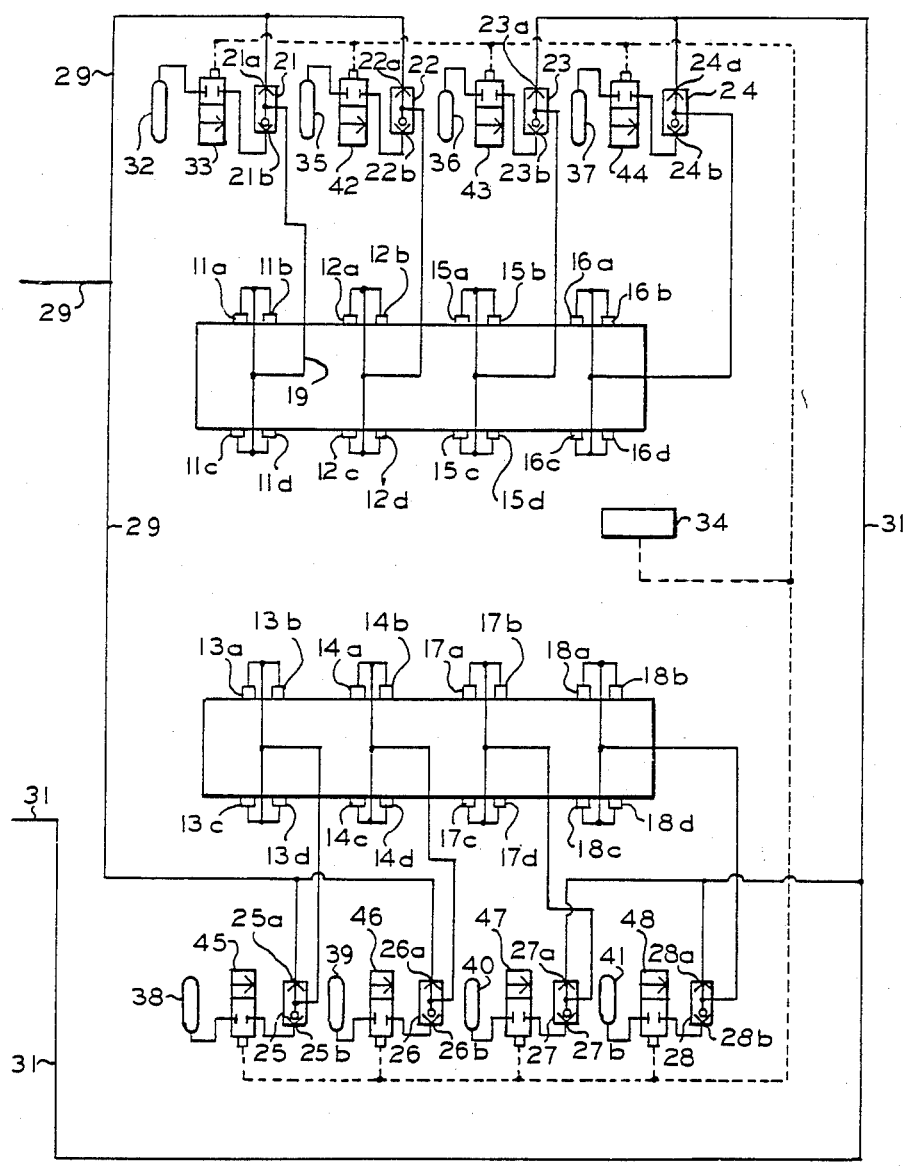

BRAKE SYSTEM

This invention relates to brake systems and more particularly to systems which may be employed with drilling rigs.

Existing hydraulic power and control systems for actuating a disc brake system of the type used on drilling rigs use a positive displacement high pressure pump to circulate fluid continuously through the control circuit. When hydraulic pressure is required to apply the brakes the fluid is throttled through an adjustable choke to allow the pressure to build to the desired value. After the desired brake pressure is attained, all of the circulating fluid is throttled from operating pressure to tank, which requires continuous power consumption resulting in excessive heat generation within the system.

It is an object of this invention to provide a brake system in which a plurality of groups of brakes are controlled by completely separate systems and a break in one of the systems is sensed by comparing pressure at the manifolds of the multiple systems and when a selected differential is noted increasing the pressure of fluid available to the multiple systems so that the increased fluid pressure active on the operative system will compensate for the loss of braking power in the damaged system to insure complete control of the braking system.

Another object is to provide multiple groups of braking elements with multiple control systems in which the pressure within the multiple systems are constantly monitored and damage to a system is determined by noting a differential in pressure and upon such occurring automatically increasing the pressure of fluid available to the brake systems so that the increased pressure available to the operative brake means will compensate for the decreased pressure available to the group of brake elements which receive the decreased pressure.

Another object is to provide a hydraulic brake system with emergency hydraulic actuation means which is completely separate from the system but utilizes the same brake elements.

Another object is to provide a brake system with emergency stopping capability completely separate from the primary source of braking power which may be charged or recharged to the desired pressure for emergency braking utilizing the primary source of power for the braking system.

Other objects features and advantages of the invention will be apparent from the drawings, specification and other claims.

In the drawings wherein illustrative embodiments of this invention are shown and wherein like reference numerals indicate like parts:

FIG. 1A and FIG. 1B are schematic illustrations of a brake system embodying this invention with 1a showing a control system which may be utilized with the brake and emergency stopping system shown in FIG. 1B;

Figure 1A:
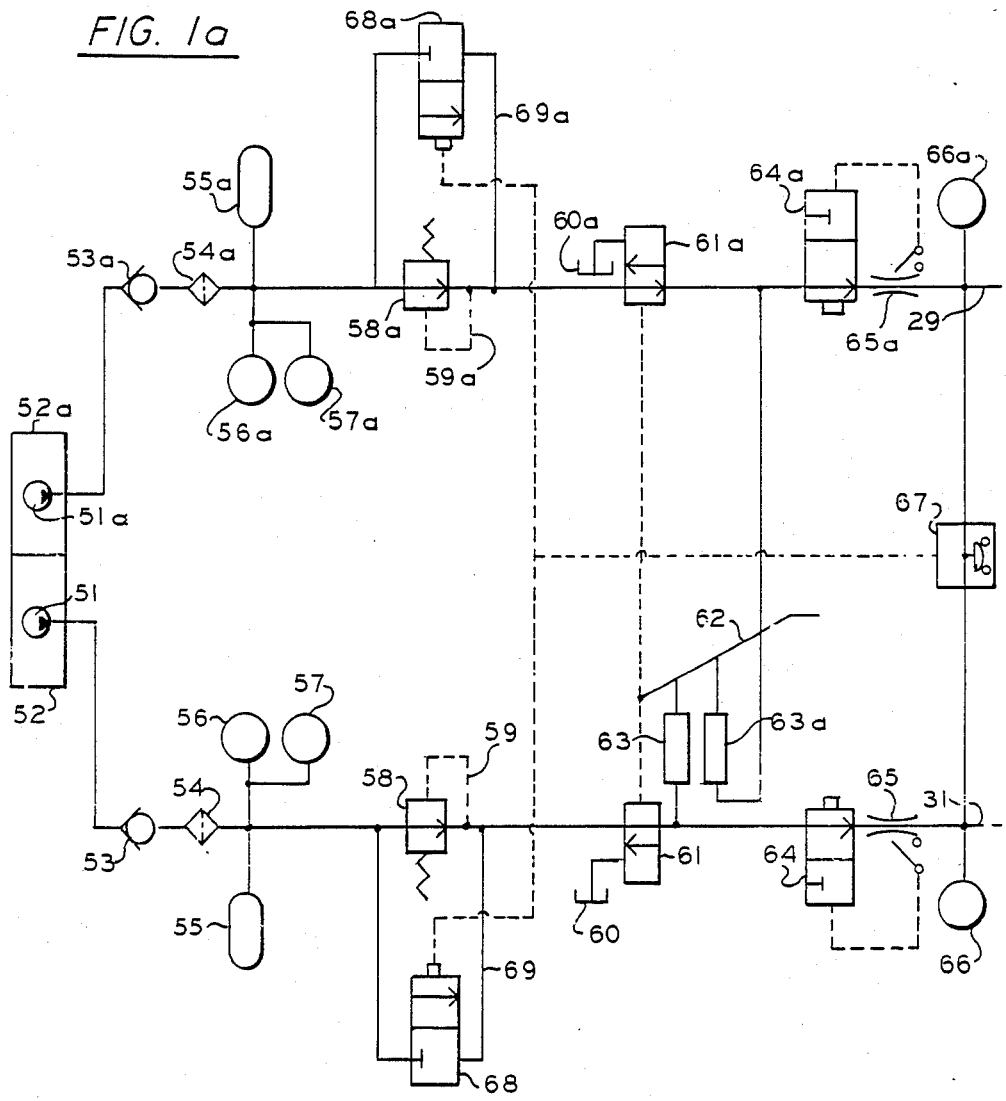

Referring first to FIG. 1B there are shown a plurality of hydraulic brake means arranged in groups. For instance the calipers 11a, b, c, d; 12a, b, c, d; 13a, b, c, d and 14a, b, c, d are all top calipers and may be considered as one group of calipers. In like manner, calipers 15a, b, c, d; 16a, b, c, d; 17a, b, c, d and 18a, b, c, d may be considered as a group of bottom calipers. These groups of calipers may be associated in subgroups as shown as for instance calipers 11a, 11b, 11c, and 11d all fed from a single hydraulic line 19 which receives hydraulic fluid under pressure from the shuttle valve 21. In like manner each subgroup of calipers series 12 through 18 receive hydraulic fluid under pressure from the shuttle valves 22 through 28 respectively.

The top calipers being served by shuttle valves 21, 22, 25 and 26 all receive fluid through their shuttle valves from the manifold 29 which is controlled by the systems to be referred to herein below. These systems also control the bottom calipers through shuttle valves 23, 24, 27 and 28 which are connected to the control system through the manifold 31. The several shuttle valves 21 through 28 are connected to their respective manifolds through ports 21a through 28a respectively.

Means are provided for emergency actuation of the several braking means. A separate emergency braking means is provided for each subgroup of calipers. Thus, the subgroup of calipers 11a, 11b, 11c, and 11d are protected by the emergency system provided by the accumulator 32 and the solenoid valve 33 which is connected to the port 21b of the shuttle valve 21. The solenoid valve 33 is normally in the closed position shown and is actuated by the driller energizing the emergency switch 34 to shift the solenoid valve to open position. When this occurs the charge of gas under pressure in the accumulator 32 will set the brakes of the top calipers 11a through 11d. The accumulator 32 is of the type having a gas charge effective on a liquid reservoir therein through a piston diaphragm or the like so that the pressure stored within the gas will drive the stored liquid through the valve 33 and shuttle valve 21 into the calipers 11a through 11d to extend the caliper shoes and operate the brake means upon energizing of the emergency switch 34. In like manner each subgroup of calipers is individually provided with its own self-contained source of operating pressure through the several shuttle valves 22 through 28 by the accumulators 35 through 41 respectively which are connected thereto by solenoid valves 42 through 48 respectively. Thus each subgroup of calipers has its own safety system all energized by the single emergency switch 34. These accumulators will be charged to a desired pressure sufficient to operate the several calipers and when an emergency occurs the shuttle valves will all be subjected to pressure from the accumulators which will force the shuttle valves to block communication with the two manifolds 29 and 31 to effect direct application of the accumulator pressure on the calipers to actuate the brake means.

It will be appreciated that each combination of solenoid valve and shuttle valve such as the solenoid valve 33 and shuttle valve 21 are in effect a two-way valve, that is a two-position valve providing for flow from two sources as with the system in the mode shown in FIG. 1B flow is between the brake calipers and the manifolds. On the other hand, when the valve 33 is shifted the shuttle valve check seats on the outlet 21a and flow occurs between the accumulator 32 and the calipers. Thus, the two valves shown in effect are a two-way valve but they are preferred in the present state of the art due to the small size equipment presently available. There is presently available a solenoid operated valve which provides for flow in two flow paths which could be substituted for these two pieces of equipment but the valve is quite large relative to a shuttle valve and a simple solenoid valve as shown in the drawings.

A charging of the several accumulators will preferably be done through a charging nipple by hand. A charging could be done with a bypass line from the main source of power but this would add additional lines to the system in which a failure might occur and it is preferred to use hand charging. On the other hand, where a two-way valve is utilized instead of the shuttle valve and block and flow solenoid valve shown it will be appreciated that after the system has been repaired the two-way valve could communicate the main source of brake power with the accumulators and they could be pressured to the desired degree utilizing the main source of power if desired.

Referring to FIG. 1A a preferred control system is shown. The system is made up of two separate identical sections, one for the top calipers and one for the bottom calipers. Referring the bottom caliper system a pump 51 is associated with reservoir 52 and delivers fluid through the back check valve 53 and filter 54 to the accumulator 55. The accumulator 55 is of the standard type having a gas section separated from the liquid section by a movable membrane such as a diaphragm or piston so that the hydraulic fluid from the pump 51 will be stored under pressure and the accumulator will serve as a source of pressure fluid and can deliver same to the brake means for operating the brake means. The system may be set up to have the pump 51 maintain the pressure within the accumulator between selected ranges so that the pump will not run continuously and need only run sufficient to maintain the accumulator within the said range.

Associated with the accumulator is the pressure gauge 56 and the low pressure switch 57 which when a low pressure is sensed in the accumulator may be utilized to sound an alarm or carry out any other functions desired such as activating a backup pump, activating emergency switch 34 to shut down the system, etc.

Hydraulic fluid from the accumulator 55 is fed to the reducing valve 58, which through the line 59 senses the output pressure from the reducing valve and maintains the output pressure at a desired level. Preferably the output pressure is one half of the accumulator pressure. Thus if the accumulator pressure is to be maintained at approximately 2,000 pounds then the output from the reducing valve 58 will preferably be approximately 1,000 pounds. In any event the output pressure from the reducing valve will be that pressure needed for operating the brake system under normal operating conditions and the input pressure to the reducing valve will some greater pressure preferably twice the amount of the normal desire operating pressure. As will appear herein below this higher pressure is used for emergency conditions.

Output from the reducing valve 58 is fed to the reducing and relieving valve 61 which controls the amount of pressure fed to the calipers. This valve is of the type that controls the output pressure based upon the position of the brake handle 62 and has the capacity for permitting flow to the brake calipers to increase pressure and of relieving pressure from the calipers to reduce this pressure when the brakes are released. The relieved pressure is fed to the tank 60 and thence back to the main reservoir 52 through a line not shown.

To provide feel for the driller a hydraulic cylinder 63 is connected to the brake handle 62 and receives fluid from the reducing and relieving valve 61 so that this fluid resists movement of the brake handle and provides the driller with a feel for the amount of brake being applied.

From the valve 61 hydraulic fluid flows to the solenoid valve 64 which is controlled by the flow switch 65. This solenoid valve 64 is normally in the open position. In the event of a break downstream which would permit an increase in flow above that normally occurred during drilling operations the flow switch 65 would sense this flow and close solenoid 64 to prevent the pump 51 and accumulator 55 pumping all of the hydraulic fluid in the system on to the floor of the drilling rig. For convenience of the driller a pressure gauge 66 is also provided downstream of the flow switch which indicates the amount of pressure in the manifold line 31.

The top calipers have an identical system provided by hydraulic pump 51a, reservoir 52a, check valve 53a, filter 54a, accumulator 55a, pressure gauge 56a, low pressure switch 57a, reducing valve 58a (controlled through line 59a), reducing and relieving valve 61a, tank 60a, solenoid valve 64a, flow switch 65a, and pressure gauge 66a. The reducing and relieving valve 61a is ganged to the brake handle 62 and a hydraulic cylinder 63a is provided so that the driller may also sense the amount of pressure applied to the top calipers.

In normal operation pressure is maintained in the two accumulators at the desired level, such pressure is reduced to the desired operating pressure in the reducing valves and operation of the brake handle operates the reducing and relieving valves to control the amount of hydraulic pressure applied to the various calipers and in this manner control the brake means for a system such as the drawworks of a drilling rig for which the system has been particularly designed. It will be appreciated that the system may be used in any desired braking situation.

At least the reducing and relieving valves 61 and 61a will be adjacent to the drillers console where the brake handle 62 will be located. This may frequently be remote from the drawworks where the several calipers are mounted for cooperation with the brake disc of a drawworks and conduits such as the manifolds 29 and 31 will extend from the drillers console to the drawworks.

Presuming that an accident occurs to the manifold 31 at some point between the drillers console and the drawworks, hydraulic pressure would be lost in line 31.

In accordance with this invention the pressure difference between the top caliper system and the bottom caliper system in the manifolds 29 and 31 is sensed to activate an emergency backup system when a differential of selected magnitude is sensed. For this purpose a differential pressure switch 67 is connected between the two manifolds 29 and 31 and senses the difference in the two manifolds. In the event that a selected differential pressure is sensed indicating a loss of pressure in one of the systems the differential pressure switch activates the bypass solenoid valve 68 in bypass line 69 which bypasses the reducing valve 58. In like manner the differential pressure switch 67 simultaneously activates the solenoid valve 68a in the bypass line 69a of the top caliper system to bypass the reducing valve 58a. Thus upon differential pressure being sensed both systems deliver full accumulator pressure to the reducing and relieving valves 61 and 61a. If it be assumed that a break occurs in manifold 31 then the velocity of flow through the flow switch 65 will increase due to this break and activate the switch 65 to activate solenoid valve 64 and close solenoid valve 64 so that the pump 51 and the accumulator 55 will not pump the contents of the reservoir 52 on to the drillers platform.

The top caliper brake system being completely separate from the bottom caliper system now delivers the full accumulator pressure through the reducing and relieving valve 61a to all of the top calipers. This higher pressure is now available for the driller to apply to the top calipers to bring the drawworks to a stop. If the accumulator pressure is twice the normal operating pressure then the driller will be able to apply twice the normal pressure to all of the top calipers to apply substantially the same amount of braking force as is normally applied to both the top and bottom calipers to bring the drawworks to a stop until the system can be repaired.

While a reference to a break in the manifold 31 was indicated as the reason for a possible loss in pressure in the bottom caliper system it will be appreciated that a break in the system anywhere downstream from the flow switch 65 would result in the loss of pressure in the system. Of course, if something happened in the system upstream of the flow switch 65 causing a loss in pressure in one of the systems this would result in a reduction in pressure in the system when the hydraulic pump and accumulator are unable to maintain pressure at the desired level. If this occurred then the differential pressure switch would again operate the two bypass solenoids 68 and 68a and the top caliper system would go to increased pressure to provide the driller with the ability to control the drawworks. Thus under any circumstances which might occur which would render ineffective one of the top and bottom calipers systems the differential pressure switch would reflect the malfunction and the increased pressure would be available in the other system to allow complete control of the drawworks.

It will be appreciated that the solenoid valves 64 and 64a and their associated flow switches 65 and 65a are only provided to retain fluid in the system in the event of a break which would result in pumping the hydraulic fluid out of the system and thus they are non-functional to the braking and emergency system and could be omitted. They are preferred, however, to retain fluid in the system in the event of a break.

As explained hereinabove, in addition to the provision for increasing pressure in one side of the system if for any reason the driller is unable to maintain control of the drawworks he can activate all of the calipers with the exception of perhaps one which may have a break in a line between the shuttle valve and caliper to immediately bring the drawworks to a complete halt by activating the emergency switch 34. When the switch 34 is activated the several emergency solenoids, such as solenoid 45, are activated to immediately bring the drawworks to a complete halt. When the switch 34 is activated, the several emergency solenoids, such as solenoid 45, are activated to expose the system to the emergency accumulators, such as accumulator 38. When this occurs the balls in the shuttle valves, such as the ball in shuttle valve 25, close the port providing communication between the shuttle valves and manifold due to the differential in pressure thereacross and the pressure of the accumulators are directed to the calipers. It will be noted that the shuttle valves are mounted so that the balls normally are seated by gravity on the port communicating with the emergency solenoids so that they do not interfere with normal flow between the shuttle valve and manifold. In an emergency situation, however, in which for some reason the manifolds are not being pressurized, the shuttle valves will function due to the differential in pressure to seat the ball on the communication with the manifolds and expose the calipers to the emergency accumulator pressure.

After the emergency condition has been removed, the several emergency solenoids, such as solenoid 45, may be closed to isolate the emergency accumulators from the calipers. Then brake pressure is applied through the systems by activating the brake handle 62 to bring the pressure in the manifolds up to the pressure in the several shuttle valves. When this occurs the differential across the ball of the shuttle valves is removed and the balls will fall by gravity to the accumulator port side thus returning the shuttle valves to normal operation. Where a two-way valve is utilized instead of the emergency solenoid and shuttle valve, switching of the two-way valve between its two positions will give the same result.

Figure 2:
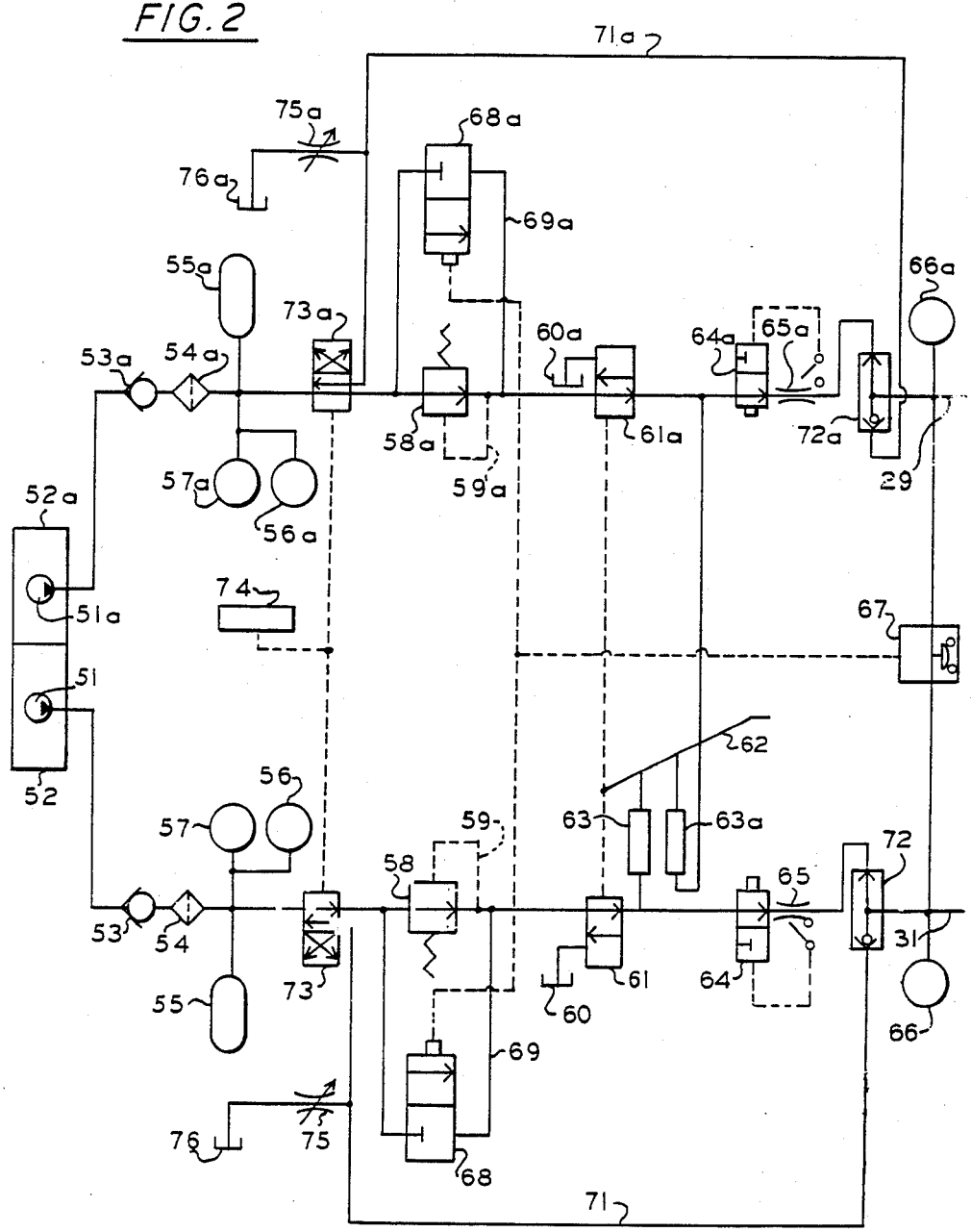
FIG. 2 is a schematic illustration of a brake control system which may be substituted for the system shown in FIG. 1A and may be utilized with the brake system shown in FIG. 1B with or without the emergency system of FIG. 1B.

In FIG. 2 there is shown the same control system as in FIG. 1 and an emergency system has been incorporated in the control system which when activated will subject all of the calipers to full accumulator pressure. This emergency system may be substituted for the several emergency accumulators and solenoids shown in Figure or it may be utilized as a redundant emergency system.

An emergency bypass 71 is connected between the accumulator 55 and a shuttle valve 72 at the output of flow switch 65a by an emergency four-way, two-position, solenoid valve 73. The top caliper system is provided with a similar bypass 71a connecting the shuttle valve 72a with the accumulator 55a through the four-way, two-position valve 73a. The two emergency valves 73 and 73a are operated by an emergency button 74 and upon activation of the emergency button 74 the two valves 73 and 73a are shifted to bypass the reducing valves, the reducing and relieving valves, and the flow valves to direct accumulator pressure directly to the shuttle valves 72 and 72a. When this occurs the balls of the shuttle valves are forced by the differential in pressure to close the port connecting them with the flow switches and full accumulator pressure is directed to the two manifolds 29 and 31, and thence to the calipers.

When the emergency condition has been corrected, the two emergency valves 73 and 73a are returned to their normal operating position and needle valves 75 and 75a are opened to vent fluid from the bypass lines 71 and 71a into the tanks 76 and 76a which are connected by lines not, shown, with the main reservoirs. The normal control system, even with the reducing and relieving valve closed, maintains the system under a few pounds of pressure and this pressure plus gravity will return the ball of the shuttle valves 72 and 72a to a position closing the connection with the bypass lines of 71 and 71a and normal operation may be resumed. The shuttle valves 72 and 72a will preferably be physically positioned immediately adjacent the calipers on the drawworks and thus the pressure within the accumulators will be bypassed about the remainder of the system and be applied directly from the accumulators to the calipers.

Figure 3:
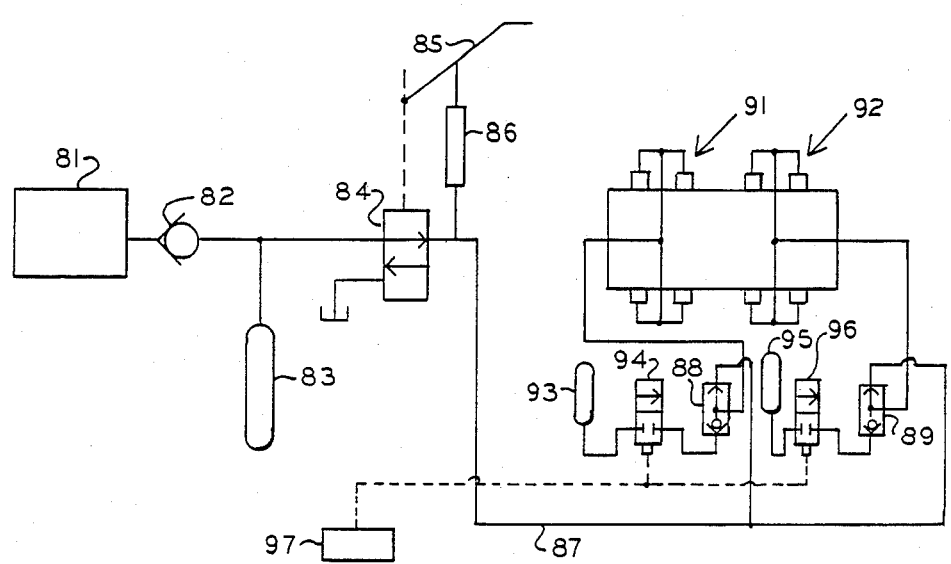
FIG. 3 is a schematic illustration of a brake system employing the same emergency system as FIG. 1B.

In FIG. 3 there is shown a simple brake system with the same emergency provisions illustrated in FIG. 1B.

A suitable source of fluid 81 such as from the hydraulic rig supply is delivered through check valve 82 to the accumulator 83. Fluid from the accumulator is fed to the brake control valve 84 which is operated by the brake handle 85 which has connected thereto the piston and cylinder 86 to provide the driller with feel for the amount of hydraulic pressure exerted on the brakes. The brake fluid is delivered through the manifold 87 to the two shuttle valves 88 and 89. The fluid from the shuttle valve 88 is delivered to the top calipers indicated generally at 91 while fluid from the shuttle valve 89 is delivered to the bottom calipers indicated generally at 92.

An accumulator 93 charged with pressure fluid is connected to the shuttle valve 88 through the emergency solenoid 94. In like manner an accumulator 95 is connected to the shuttle valve 89 through the emergency solenoid valve 96.

An emergency switch 97 is provided and upon actuation of the emergency switch 97 the two emergency solenoids 94 and 96 connect their respective accumulators 93 and 95 to the shuttle valves 88 and 89 to deliver the full pressure of the accumulators 93 and 95 to the top and bottom calipers in the same manner as disclosed in FIG. 1B.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A brake system comprising:
   a plurality of hydraulic brake means arranged in groups;
   a separate hydraulic manifold for each group;
   a separate control system for each manifold comprising:
     a source of hydraulic fluid under high pressure,
     a reducing valve reducing said high pressure fluid to a lower pressure fluid,
     a fluid bypass around said reducing valve,
     bypass valve means controlling said fluid bypass,
     means connecting said reducing valve and said fluid bypass to a manifold and including means controlling application of at least said lower pressure fluid to said manifold to control application of said brake means;
   said control means of each separate system ganged together for simultaneous operation; and
   a differential pressure switch sensing the pressure in each manifold and when said pressures reach a selected differential opening said bypass valve to expose each separate system to said high pressure fluid.

2. The brake system of claim 1 wherein
   said reducing valve and said bypass are connected to said control means to increase the pressure of fluid at said control means of each system upon opening of said bypass valves.

3. The brake system of claim 1 or 2 wherein
   flow valve means is provided between each manifold and control means and closes to isolate said manifold upon flow reaching a selected valve to isolate the system from a leak downstream of said flow valve means.

4. The brake system of claim 1 or 2 wherein
   a shuttle valve is provided between each brake means and its manifold;
   an emergency control valve means is in fluid communication with each shuttle valve; and
   a self contained source of pressure communicates with the emergency control valve means providing emergency pressure to shift the shuttle valve to emergency mode and operate the brake means upon opening of said emergency control valve means.

5. The brake system of claim 4 wherein
   a separate emergency control valve means and self contained source of pressure is provided for each shuttle valve.

6. The brake system of claim 1 or 2 wherein
   a two-direction valve is provided between each brake means and its manifold; and
   a self contained source of pressure communicated with the two-direction valve providing emergency pressure to operate the brake means upon communication of the source of pressure with the brake means by the two-direction valve.

7. The brake system of claim 1 or 2 wherein
   a two-position valve alternately connects the source of fluid with the reducing valve and a bypass line; and
   a shuttle valve connects the bypass line with the manifold, and an emergency switch operates the two-position valve to apply full accumulator pressure to all of the brake means.

8. A brake system comprising:
   a plurality of hydraulic brake means;
   a separate shuttle valve in fluid communication with each brake means;
   brake control means in fluid communication with one inlet of each shuttle valve providing for normal operation of the brake means;
   emergency control valve means in fluid communication with the other inlet of each shuttle valve; and
   a self contained source of pressure communicating with the emergency control valve means providing emergency pressure to shift the shuttle valve to emergency mode and operate the brake means upon opening of said emergency control valve means.

9. The system of claim 8 wherein a separate emergency control valve means and self contained source of pressure is provided for each shuttle valve.

* * * * *